United States Patent

Suzuki et al.

[11] Patent Number: 5,570,203
[45] Date of Patent: Oct. 29, 1996

[54] IMAGE SIGNAL CODING DEVICE

[75] Inventors: Kazuhiro Suzuki; Taro Yokose; Toshiaki Yoshinari; Yutaka Koshi; Koh Kamizawa, all of Kanagawa, Japan

[73] Assignee: Fuji Xerox Co., Ltd., Tokyo, Japan

[21] Appl. No.: 325,143

[22] Filed: Oct. 20, 1994

[30]  Foreign Application Priority Data

Oct. 22, 1993 [JP] Japan .................. 5-265154

[51] Int. Cl.$^6$ .............. H04N 1/413; H04N 1/415
[52] U.S. Cl. ............... 358/432; 358/433; 382/246; 382/248; 382/250; 382/251; 348/405; 348/403
[58] Field of Search .................. 358/432, 433; 348/403, 405; 382/246, 248, 250, 251

[56]  References Cited

U.S. PATENT DOCUMENTS 5,333,013 7/1994 Enari et al. ............... 348/405
5,335,016 8/1994 Nakagawa ................ 348/405

FOREIGN PATENT DOCUMENTS 3-262381 11/1991 Japan .
9517073 6/1995 WIPO .

OTHER PUBLICATIONS

"The JPEG Still Picture Compression Standard" Gregory K. Wallace et al., Communications of the ACM, Apr. 1991.

*Primary Examiner*—Scott A. Rogers
*Attorney, Agent, or Firm*—Finnegan, Henderson, Farabow, Garrett & Dunner, L.L.P.

[57]  ABSTRACT

An image signal coding device capable of attaining a high-speed coding operation without increasing a circuit scale. The image signal coding device includes a DCT section for performing two-dimensional orthogonal transform to each of plural pixel blocks obtained by dividing an image signal to generate a transform coefficient, a linear quantization section for linearly quantizing the transform coefficient by using given quantization characteristics to generate a quantized coefficient, and a variable length coding section for performing variable length coding to the quantized coefficient to generate code data. The image signal coding device further includes an effective region holding section for holding region information including a range of the transform coefficient to be linearly quantized by the linear quantization section and a range of the quantized coefficient to be coded by the variable length coding section.

9 Claims, 21 Drawing Sheets

| 0 | 1 | 5 | 6 | 14 | 15 | 27 | 28 |
|---|---|---|---|---|---|---|---|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

| | | | | | | | |
|---|---|---|---|---|---|---|---|
| -  | 24686 | 18456 | 10548 | 5273 | 1567 | 398 | 130 |
| 25324 | 17200 | 11665 | 6577 | 3233 | 225 | 34 | 10 |
| 15753 | 12192 | 8540 | 4157 | 1091 | 139 | 4 | 9 |
| 12299 | 7607 | 4715 | 2045 | 234 | 5 | 0 | 1 |
| 7398 | 4337 | 1236 | 197 | 21 | 0 | 0 | 0 |
| 3538 | 1221 | 236 | 21 | 0 | 0 | 0 | 0 |
| 408 | 54 | 18 | 0 | 0 | 0 | 0 | 0 |
| 19 | 1 | 0 | 0 | 0 | 0 | 0 | 0 |

FREQUENCY OF OCCURRENCE OF SIGNIFICANT QUANTIZATION COEFFICIENT IN CASE OF QUANTIZATION BY USING QUANTIZATION MATRIX SHOWN IN FIG. 5A

FIG. 3B

| | | | | | | | |
|---|---|---|---|---|---|---|---|
| -  | 33686 | 26253 | 18035 | 10020 | 4309 | 1752 | 710 |
| 34074 | 26207 | 17330 | 12072 | 6843 | 1457 | 656 | 308 |
| 21729 | 17736 | 14833 | 8599 | 3594 | 1036 | 299 | 219 |
| 18345 | 12341 | 8632 | 4940 | 1574 | 181 | 81 | 66 |
| 12161 | 8002 | 3598 | 1256 | 371 | 7 | 1 | 3 |
| 7753 | 3646 | 1390 | 546 | 67 | 14 | 1 | 3 |
| 1639 | 723 | 384 | 135 | 2 | 0 | 0 | 2 |
| 378 | 32 | 17 | 5 | 0 | 1 | 0 | 0 |

FREQUENCY OF OCCURRENCE OF SIGNIFICANT QUANTIZATION COEFFICIENT IN CASE OF QUANTIZATION BY USING QUANTIZATION MATRIX SHOWN IN FIG. 5B

FIG. 4A

| | | | | | | | |
|---|---|---|---|---|---|---|---|
| - | - | 19004 | 12134 | 5983 | 2311 | 320 | 29 | 1 |
| 18710 | 11243 | 6785 | 3124 | 949 | 6 | 4 | 0 |
| 10498 | 7819 | 4528 | 1388 | 128 | 4 | 0 | 0 |
| 7437 | 4121 | 1807 | 467 | 14 | 0 | 0 | 0 |
| 3781 | 1622 | 195 | 8 | 1 | 0 | 0 | 0 |
| 1222 | 198 | 4 | 0 | 0 | 0 | 0 | 0 |
| 58 | 0 | 0 | 0 | 0 | 0 | 0 | 0 |
| 0 | 0 | | | | | | |

FREQUENCY OF OCCURRENCE OF SIGNIFICANT QUANTIZATION COEFFICIENT IN CASE OF QUANTIZATION BY USING QUANTIZATION MATRIX SHOWN IN FIG. 5C

FIG. 4B

| | | | | | | | |
|---|---|---|---|---|---|---|---|
| - | - | 13250 | 7556 | 2870 | 683 | 2 | 0 | 0 |
| 12901 | 6759 | 3284 | 994 | 87 | 0 | 0 | 0 |
| 6585 | 4070 | 1675 | 233 | 1 | 0 | 0 | 0 |
| 3908 | 1518 | 321 | 30 | 0 | 0 | 0 | 0 |
| 1441 | 337 | 4 | 0 | 0 | 0 | 0 | 0 |
| 189 | 3 | 0 | 0 | 0 | 0 | 0 | 0 |
| 0 | 0 | 0 | 0 | 0 | 0 | 0 | 0 |
| 0 | | | | | | | |

FREQUENCY OF OCCURRENCE OF SIGNIFICANT QUANTIZATION COEFFICIENT IN CASE OF QUANTIZATION BY USING QUANTIZATION MATRIX SHOWN IN FIG. 5D

| 16 | 11 | 10 | 16 | 24 | 40 | 51 | 61 |
| --- | --- | --- | --- | --- | --- | --- | --- |
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

QUANTIZATION MATRIX

FIG. 5A

| 8 | 6 | 5 | 8 | 12 | 20 | 26 | 31 |
| --- | --- | --- | --- | --- | --- | --- | --- |
| 6 | 6 | 7 | 10 | 13 | 29 | 30 | 28 |
| 7 | 7 | 8 | 12 | 20 | 29 | 35 | 28 |
| 7 | 9 | 11 | 15 | 26 | 44 | 40 | 31 |
| 9 | 11 | 19 | 28 | 34 | 55 | 52 | 39 |
| 12 | 18 | 28 | 32 | 41 | 52 | 57 | 46 |
| 25 | 32 | 39 | 44 | 52 | 61 | 60 | 51 |
| 36 | 46 | 48 | 49 | 56 | 50 | 52 | 50 |

QUANTIZATION MATRIX SET BY MULTIPLYING 1/2 BY EACH QUANTIZATION THRESHOLD OF QUANTIZATION MATRIX SHOWN IN FIG. 5A

FIG. 5B

|     |     |     |     |     |     |     |     |
|----:|----:|----:|----:|----:|----:|----:|----:|
|  32 |  22 |  20 |  32 |  48 |  80 | 102 | 122 |
|  24 |  24 |  28 |  38 |  52 | 116 | 120 | 110 |
|  28 |  26 |  32 |  48 |  80 | 114 | 138 | 112 |
|  28 |  34 |  44 |  58 | 102 | 174 | 160 | 124 |
|  36 |  44 |  74 | 112 | 136 | 218 | 206 | 154 |
|  48 |  70 | 110 | 128 | 162 | 208 | 226 | 184 |
|  98 | 128 | 156 | 174 | 206 | 242 | 240 | 202 |
| 144 | 184 | 190 | 196 | 224 | 200 | 206 | 196 |

QUANTIZATION MATRIX SET BY MULTIPLYING 2 BY EACH QUANTIZATION THRESHOLD OF QUANTIZATION MATRIX SHOWN IN FIG. 5A

FIG. 5C

|     |     |     |     |     |     |     |     |
|----:|----:|----:|----:|----:|----:|----:|----:|
|  64 |  44 |  40 |  64 |  96 | 160 | 204 | 244 |
|  48 |  48 |  56 |  76 | 104 | 232 | 240 | 220 |
|  56 |  52 |  64 |  96 | 160 | 228 | 255 | 224 |
|  56 |  68 |  88 | 116 | 204 | 255 | 255 | 248 |
|  72 |  88 | 148 | 224 | 255 | 255 | 255 | 255 |
|  96 | 140 | 220 | 255 | 255 | 255 | 255 | 255 |
| 196 | 255 | 255 | 255 | 255 | 255 | 255 | 255 |
| 255 | 255 | 255 | 255 | 255 | 255 | 255 | 255 |

QUANTIZATION MATRIX SET BY MULTIPLYING 4 BY EACH QUANTIZATION THRESHOLD OF QUANTIZATION MATRIX SHOWN IN FIG. 5A

FIG. 5D

|   |   |   |   |   |   | MAXIMUM DEGREE=42 |
|---|---|---|---|---|---|---|
| - | 24686 | 18456 | 10548 | 5273 | 1567 | 398 | 130 |
| 25324 | 17200 | 11665 | 6577 | 3233 | 225 | 34 | ⑩ |
| 15753 | 12192 | 8540 | 4157 | 1091 | 139 | 4 | 9 |
| 12299 | 7607 | 4715 | 2045 | 234 | 5 | 0 | 1 |
| 7398 | 4337 | 1236 | 197 | 21 | 0 | 0 | 0 |
| 3538 | 1221 | 236 | 21 | 0 | 0 | 0 | 0 |
| 408 | 54 | 18 | 0 | 0 | 0 | 0 | 0 |
| 19 | 1 | 0 | 0 | 0 | 0 | 0 | 0 |

EFFECTIVE REGION SET ACCORDING TO QUANTIZATION MATRIX SHOW IN FIG. 5A

FIG. 7A

|   |   |   |   |   |   | MAXIMUM DEGREE=53 |
|---|---|---|---|---|---|---|
| - | 33686 | 26253 | 18035 | 10020 | 4309 | 1752 | 710 |
| 34074 | 26207 | 17330 | 12072 | 6843 | 1457 | 656 | 308 |
| 21729 | 17736 | 14833 | 8599 | 3594 | 1036 | 299 | 219 |
| 18345 | 12341 | 8632 | 4940 | 1574 | 181 | 81 | ㊻ |
| 12161 | 8002 | 3598 | 1256 | 371 | 7 | 1 | 8 |
| 7753 | 3646 | 1390 | 546 | 67 | 14 | 1 | 3 |
| 1639 | 723 | 384 | 135 | 2 | 0 | 0 | 2 |
| 378 | 32 | 17 | 5 | 0 | 1 | 0 | 0 |

EFFECTIVE REGION SET ACCORDING TO QUANTIZATION MATRIX SHOW IN FIG. 5B

MAXIMUM DEGREE = 35

FIG. 8A EFFECTIVE REGION SET ACCORDING TO QUANTIZATION MATRIX SHOWN IN FIG. 5C

```
- - -   13250    7556    2870     683       2      0      0
12901    6759    3284     994      87       0      0      0
 6585    4070    1675     233       1       0      0      0
 3908    1518     321      30       0       0      0      0
 1441     337       4       0       0       0      0      0
  189       3       0       0       0       0      0      0
    0       0       0       0       0       0      0      0
```

MAXIMUM DEGREE = 27

FIG. 8B EFFECTIVE REGION SET ACCORDING TO QUANTIZATION MATRIX SHOWN IN FIG. 5D

```
169  167  169  168   163  160   156  152
168  169  168  168   163  161   162  157
166  168  167  161   158  161   158  158
167  164  164  161   160  158   158  157
166  161  160  161   159  158   158  155
161  161  159  159   164  158   158  155
158  156  157  156   157  158   156  154
154  152  154  150   150  150   150  148
```

PIXEL BLOCK

TRANSFORM COEFFICIENT

QUANTIZATION MATRIX

FIG. 10C
PRIOR ART

```
16    2    0    0    0    0    0    0
 2    1    0    0    0    0    0    0
-1    0    0    0    0    0    0    0
 1    0    0    0    0    0    0    0
 0    0    0    0    0    0    0    0
 0    0    0    0    0    0    0    0
 0    0    0    0    0    0    0    0
 0    0    0    0    0    0    0    0
```
QUANTIZATION COEFFICIENT

FIG. 12A
PRIOR ART

```
256   22    0    0    0    0    0    0
 24   12    0    0    0    0    0    0
-14    0    0    0    0    0    0    0
 14    0    0    0    0    0    0    0
  0    0    0    0    0    0    0    0
  0    0    0    0    0    0    0    0
  0    0    0    0    0    0    0    0
  0    0    0    0    0    0    0    0
```
REVERSE QUANTIZATION COEFFICIENT

FIG. 12B
PRIOR ART

```
171  170  168  165  163  160  158  157
168  167  166  163  161  159  157  156
166  165  164  162  160  158  156  155
166  165  164  163  161  159  158  157
166  166  165  163  162  161  160  160
163  163  162  161  161  160  159  159
157  157  157  156  156  155  155  155
152  152  152  152  151  151  151  151
```
DECODED PIXEL BLOCK

FIG. 12C
PRIOR ART

| GROUP NUMBER | DIFFERENCE IN DC COMPONENT | NUMBER OF OVERHEAD BITS |
|---|---|---|
| 0 | 0 | 0 |
| 1 | -1,1 | 1 |
| 2 | -3,-2,2,3 | 2 |
| 3 | -7..,-4,4,..7 | 3 |
| 4 | -15..-8,8..15 | 4 |
| 5 | -31..-16,16..31 | 5 |
| 6 | -63.. -32,32..63 | 6 |
| 7 | -127..-64,64..127 | 7 |
| 8 | -255..-128,128..255 | 8 |
| 9 | -511..-256,256..511 | 9 |
| 10 | -1023..-512, 512..1023 | 10 |
| 11 | -2047..-1024,1024..2047 | 11 |
| 12 | -4095..-2048,2048..4095 | 12 |
| 13 | -8091..-4096,4096..8091 | 13 |
| 14 | -16383..-8092,8092..16383 | 14 |
| 15 | -32767..-16384,16384.. 32767 | 15 |

FIG. 13
PRIOR ART
(Size)

| GROUP NUMBER | AC COMPONENT | NUMBER OF OVERHEAD BITS |
|---|---|---|
| 1 | -1, 1 | 1 |
| 2 | -3, -2, 2, 3 | 2 |
| 3 | -7.., -4, 4,..7 | 3 |
| 4 | -15.. - 8, 8.. 15 | 4 |
| 5 | -31.. -16, 16..31 | 5 |
| 6 | -63.. -32, 32 ..63 | 6 |
| 7 | -127.. -64, 64..127 | 7 |
| 8 | -255.. -128, 128..255 | 8 |
| 9 | 511..-256, 256.. 511 | 9 |
| 10 | -1023..-512, 512..1023 | 10 |
| 11 | -2047..-1024, 1024.. 2047 | 11 |
| 12 | -4095..-2048, 2048.. 4095 | 12 |
| 13 | -8091.. -4096, 4096..8091 | 13 |
| 14 | -16383..-8092, 8092..16383 | 14 |
| 15 | -32767..-16384, 16384 .. 32767 | 15 |

*FIG. 15*

PRIOR ART

| RUN \ SIZE | 0 | 1 | 2 | ... | 15 |
|---|---|---|---|---|---|
| 0 | (0,0) | (0,1) | (0,2) | ... | (0,15) |
| 1 | (1,0) | (1,1) | | | |
| 2 | (2,0) | | | | |
| ... | ... | | | | |
| 15 | (15,0) | | | | (15,15) |

CODING SYMBOLS DECIDED BY COMBINATIONS OF NNNN AND SSSS

SIZE : RUN OF INEFFECTIVE COEFFICIENT (ZERO) FROM 0 TO 15

RUN : GROUP NUMBER OF EFFECTIVE COEFFICIENT

WHERE,
(0, 0) EOB (BLOCK END CODE)
(0, 15) ZRL (ZERO RUN OF 16)

FIG. 16
*PRIOR ART*

```
( RUN    /SIZE )
(    0,    0 )   1 0 1 0
(    0,    1 )   0 0
(    0,    2 )   0 1
(    0,    3 )   1 0 0
(    0,    4 )   1 0 1 1
(    0,    5 )   1 1 0 1 0
(    0,    6 )   1 1 1 1 0 0 0
(    0,    7 )   1 1 1 1 1 0 0 0
(    0,    8 )   1 1 1 1 1 1 0 1 1 0
(    0,    9 )   1 1 1 1 1 1 1 1 1 0 0 0 0 0 1 0
(    0,   10 )   1 1 1 1 1 1 1 1 1 0 0 0 0 0 1 1
(    1,    1 )   1 1 0 0
(    1,    2 )   1 1 0 1 1
(    1,    3 )   1 1 1 1 0 0 1
(    1,    4 )   1 1 1 1 1 0 1 1 0
(    1,    5 )   1 1 1 1 1 1 1 0 1 1 0
(    1,    6 )   1 1 1 1 1 1 1 1 1 0 0 0 0 1 0 0
(    1,    7 )   1 1 1 1 1 1 1 1 1 0 0 0 0 1 0 1
(    1,    8 )   1 1 1 1 1 1 1 1 1 0 0 0 0 1 1 0
(    1,    9 )   1 1 1 1 1 1 1 1 1 0 0 0 0 1 1 1
(    1,   10 )   1 1 1 1 1 1 1 1 1 0 0 0 1 0 0 0
(    2,    1 )   1 1 1 0 0
(    2,    2 )   1 1 1 1 1 0 0 1
(    2,    3 )   1 1 1 1 1 0 1 1 1
(    2,    4 )   1 1 1 1 1 1 1 0 1 0 0
(    2,    5 )   1 1 1 1 1 1 1 1 1 0 0 0 1 0 0 1
(    2,    6 )   1 1 1 1 1 1 1 1 1 0 0 0 1 0 1 0
(    2,    7 )   1 1 1 1 1 1 1 1 1 0 0 0 1 0 1 1
(    2,    8 )   1 1 1 1 1 1 1 1 1 0 0 0 1 1 0 0
```

DC ( IN CASE THE DIFFERENCE IN DC COEFFICIENT
BETWEEN THE CURRENT BLOCK AND THE IMMEDIATELY
PREVIOUS BLOCK IS 2 )

| (GROUP NUMBER)<br>(2) | HUFFMAN CODE<br>011 | OVERHEAD BITS<br>10 |
|---|---|---|

AC

| (RUN LENGTH,<br>GROUP NUMBER) | HUFFMAN CODE | OVERHEAD BITS |
|---|---|---|
| ( 0 , 2 ) | 0 1 | 1 0 |
| ( 0 , 2 ) | 0 1 | 1 0 |
| ( 0 , 1 ) | 1 0 | 0 |
| ( 0 , 1 ) | 1 0 | 1 |
| ( 4 , 1 ) | 1 1 1 0 1 1 | 1 |
| ( 1 5 , 0 ) | 1 1 1 1 1 1 1 1 0 0 1 | B L A N K |
| ( 1 5 , 0 ) | 1 1 1 1 1 1 1 1 0 0 1 | B L A N K |
| ( 1 5 , 0 ) | 1 1 1 1 1 1 1 1 0 0 1 | B L A N K |
| ( 0 , 0 ) | 1 0 1 0 | B L A N K |

FIG. 19
PRIOR ART 0 1 1 1 0   0 1   1 0   0 1   1 0   1 0   0   1 0
1   1 1 1 0 1 1   1   1 1 1 1 1 1 1 1 0 0 1
1 1 1 1 1 1 1 1 0 0 1   1 1 1 1 1 1 1 1 0 0 1
1 0 1 0

( FULL 63 BITS )

FIG. 20
PRIOR ART

IMAGE SIGNAL CODING DEVICE

BACKGROUND OF THE INVENTION

1. Field of the Invention

The present invention relates to a coding device for an image signal having gradation.

2. Description of the Related Art

In handling an image having gradation in an image processing device or the like, image information is generally coded to thereby compress an amount of information, because digitization of the original image information brings about a large amount of information.

While various methods for coding an image signal are known, a transform coding system is known as a typical coding method for an image having gradation.

Generally, in an image called a natural image such as a landscape picture and a portrait picture, it is known that adjacent pixels tend to have near pixel values and show a high correlativity. Such a high correlativity of signals as viewed on an axis of frequency means a concentrated distribution of signal power in a low-frequency component. By coding only the low-frequency component where the signal power is concentrated, the total amount of information can be reduced.

The transform coding system uses this property in such a manner that a large number of bits are allocated to a low-frequency component where the signal power is concentrated and a small number of bits are allocated to a high-frequency component where the signal power is not concentrated, thus reducing the total amount of information.

The JPEG (Joint Photographic Expert Group) system known as an international standard system for still picture coding as disclosed in G. K. Wallace: "The JPEG Still Picture Compression Standard", Communications of the ACM (April, 1991) adopts an algorithm based on Discrete Cosine Transform (which will be hereinafter abbreviated to DCT) as one kind of the transform coding system.

The configuration of the transform coding system will now be described with reference to FIG. 9 showing a fundamental block diagram.

Referring to FIG. 9, reference numeral 100 denotes a DCT section for performing DCT to each of plural pixel blocks obtained by dividing an image into rectangular pixel regions to generate a transform coefficient of a spatial frequency component; reference numeral 101 denotes a linear quantization section for linearly quantizing the transform coefficient by using a quantization threshold set in a quantization matrix 102 to generate a quantized coefficient; and reference numeral 103 denotes a variable length coding section for coding the quantization coefficient by using a Huffman code table 104 to generate code data.

The coding operation will now be described with reference to FIG. 9.

In the DCT section 100, each pixel block consisting of 8×8 pixels as a rectangular region is subjected to DCT. Eight-degree two-dimensional DCT is given by Eq. (1), and inverse transform is given by Eq. (2).

$$F(u,v) = \frac{C(u)C(v)}{4} \sum_{j=0}^{7} \sum_{k=0}^{7} f(j,k) \cos \frac{(2j+1)u\pi}{16} \cos \frac{(2k+1)v\pi}{16} \quad (1)$$

$$f(j,k) = \frac{1}{4} \sum_{u=0}^{7} \sum_{v=0}^{7} C(u)C(v)F(u,v) \cos \frac{(2j+1)u\pi}{16} \cos \frac{(2k+1)v\pi}{16} \quad (2)$$

where $$C(u) = C(v) = \begin{cases} \frac{1}{\sqrt{2}} & k,1 = 0 \\ 1 & k,1 = 1, 2, 3, \ldots, 7 \end{cases} \quad (3)$$

where f(j,k) represents each element of the pixel block, and j and k represent a position of each element; and F(u,v) represents each element of the transform coefficient, and u and v represent a position of each element.

Figures 10A, 10B, 10C:
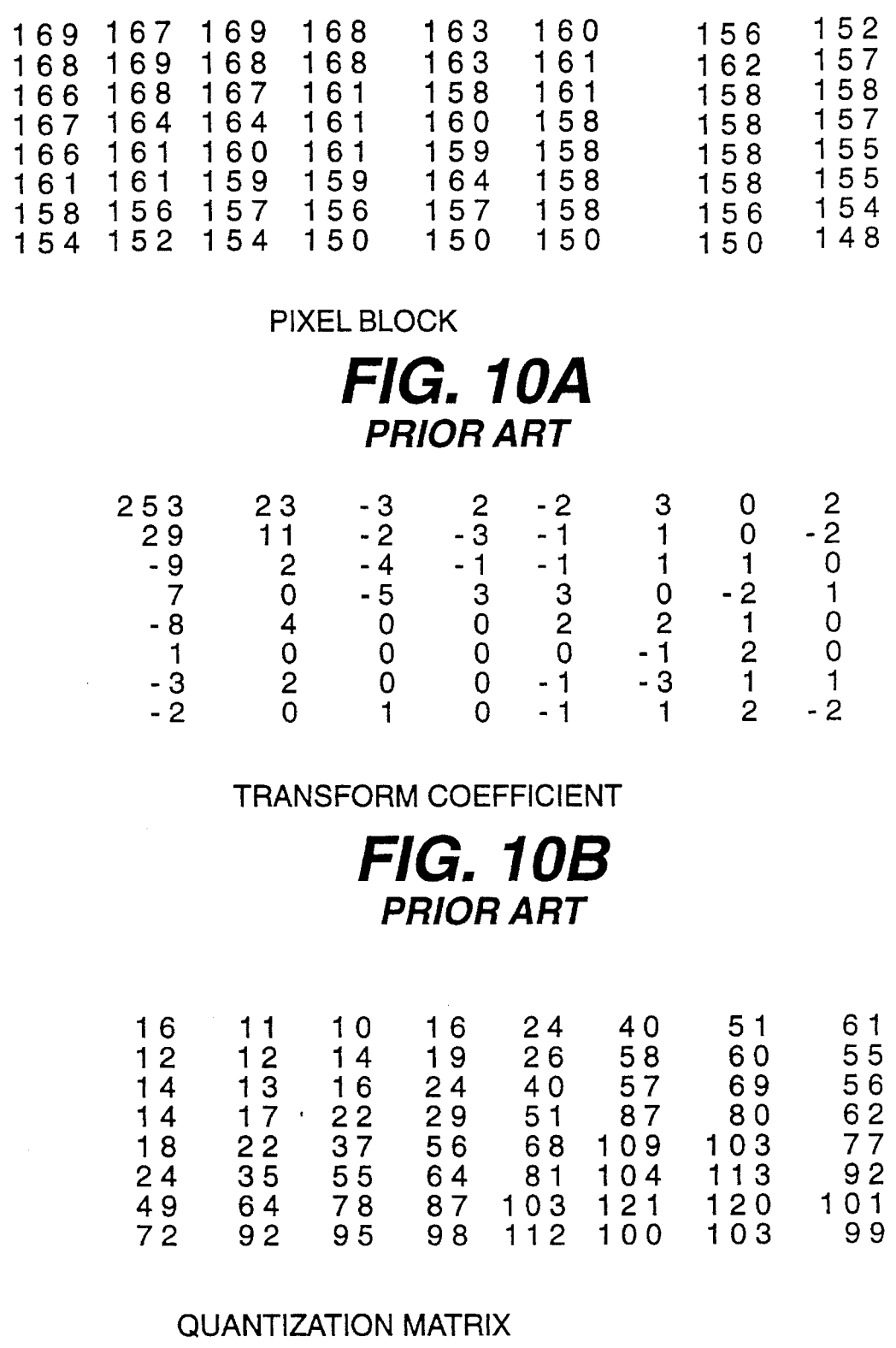

FIG. 10A shows an example of the pixel block consisting of 8×8 pixels input into the DCT section 100. FIG. 10B shows all elements of the transform coefficient obtained by performing the eight-degree two-dimensional DCT given by Eq. (1) to all pixels in the pixel block. As shown in FIG. 11, the left uppermost element of the matrix of the transform coefficient corresponds to an average brightness of the pixel blocks, and it is accordingly called a DC coefficient. The other elements except the DC coefficient are called an AC coefficient.

As shown in FIG. 11, the righter the column of the elements of the AC coefficient, the higher the frequency component in the horizontal direction, and the lower the row of the elements of the AC coefficient, the higher the frequency component in the vertical direction. That is, the right lowermost element of the matrix of the AC coefficient corresponds to the maximum frequency component in the horizontal and vertical directions.

The transform coefficient generated from the DCT section 100 is quantized in the linear quantization section 101 and is generated as the quantized coefficient therefrom. The quantization is a processing of dividing each element of the transform coefficient by the corresponding element of the quantization matrix to obtain a quotient, and is defined by the following expressions.

$$F^Q(u,v) = (F(u,v) + (Q(u,v)/2))Q(u,v) \quad (F(u,v) \geq 0) \quad (4)$$

$$F^Q(u,v) = (F(u,v) - (Q(u,v)/2))Q(u,v) \quad (F(u,v) < 0) \quad (5)$$

where F(u,v), Q(u,v), and $F^Q(u,v)$ represent each element of the transform coefficient, each element of the quantization matrix, and each element of the quantized coefficient, respectively, and u and v represent a position of each element.

FIG. 10C shows an example of the quantization matrix decided in consideration of visual characteristics of each frequency component. In a natural image, the signal power is concentrated at a low-frequency coefficient. Therefore, as shown in FIG. 10C, it is general that the transform coefficient corresponding to a low-frequency component is precisely quantized by using a small value and that the transform coefficient corresponding to a high-frequency component is roughly quantized by using a large value.

FIG. 12A shows a quantized coefficient obtained by linearly quantizing the transform coefficient shown in FIG. 10B by using the quantization matrix shown in FIG. 10C.

The quantized coefficient generated from the linear quantization section 101 is coded by Huffman coding in the variable length coding section 103. The Huffman code table 104 is used for both the DC component and the AC component, and the coding of both components is individually performed.

The coding of the DC coefficient will now be described. First, a difference in DC coefficient between the current block and the immediately previous block is obtained, and a plurality of group numbers are decided according to all differences obtained as shown in FIG. 13. Then, the group numbers are coded by Huffman coding. Further, a plurality of overhead bits each having the same number of bits as the corresponding group number are added, so as to indicate the correspondence between the difference and the group number.

It is assumed that the DC component in the immediately previous block with respect to the quantized coefficient shown in FIG. 12A is 14, the difference in DC component between the current block and the immediately previous block is given by 16−14=+2. In this case, it is understood from FIG. 13 that the group number is 2. Further, it is understood from FIG. 14 showing the Huffman code table for the DC component that the code corresponding to the group number "2" is a binary code "011". Further, in order to identify four values of −3, −2, 2, and 3 belonging to the group number "2", 2-bit information is added In case of identifying the value "2", 2-bit information "10" is added.

The coding of the AC coefficient will now be described.

The AC coefficient is made one-dimensional by zigzag scanning the matrix shown in FIG. 2 in the numerical order of 1 to 63. In this zigzag scanning, a length of continuation (zero run) of a zero coefficient (ineffective coefficient) is counted until a non-zero coefficient (effective coefficient) appears. When the effective coefficient appears, a group number corresponding to the AC coefficient is decided as shown in FIG. 15. Further, overhead bits indicating the correspondence between the AC coefficient and the group number are also decided as shown in FIG. 15.

In the Huffman code table for the AC coefficient, Huffman codes are allocated to the combinations of the zero runs of the ineffective coefficient and the group numbers of the effective coefficient subsequent to the ineffective coefficient. FIG. 16 shows the combinations of the zero runs of the ineffective coefficient and the group numbers of the effective coefficient, that is, 256 combinations of (0,0) to (15,15). All the combinations are correspondingly given binary codes as shown in FIGS. 17 and 18.

Thus, all elements of the AC coefficient are coded with the combinations of the zero runs of the ineffective coefficient and the group numbers of the effective coefficient subsequent to the ineffective coefficient and with the overhead bits indicating the correspondence between the effective coefficient and the group number. Until all elements of the effective coefficient in each block are completely processed, the above operation is repeated. Further, when the remaining elements of the AC coefficient in each block are identified as all zero, and an EOB (block end code) is coded at this time to end the processing of one block.

FIG. 19 shows an example of the coding of the quantized coefficient shown in FIG. 12A in accordance with the above procedure, and FIG. 20 shows a bit string to be output as a code. The information of 512 bits that are all bits in one block consisting of 8×8 pixels each formed by 8 bits is compressed to 63 bits as all bits.

In decoding the image information, Huffman decoding is performed in the reverse procedure of the above to reproduce the quantized coefficient shown in FIG. 12A. Then, each element of the quantized coefficient is multiplied by the corresponding element of the quantization matrix shown in FIG. 10C to thereby obtain a dequantized coefficient shown in FIG. 12B. Then, the dequantized coefficient obtained is subjected to the inverse DCT expressed by Eq. (2) to thereby obtain a reconstructed pixel block shown in FIG. 12C.

Thus, the image information can be coded and decoded by performing the above processings in accordance with the transform coding system.

However, in quantizing the transform coefficient by using the transform coding system, all elements of the transform coefficient corresponding to all pixels are divided by the respective quantization thresholds, thus requiring much time for computation of quantization to render an operating speed slow.

A method for attaining a high-speed operation of quantization is disclosed in Japanese Patent Laid-open No. Hei 3-262381. In the image data coding method and device described in this literature, some of the elements of the transform coefficient that become zero after DCT are detected before quantization, and the division of these zero elements is omitted to thereby reduce an amount of computation.

The configuration of the system disclosed in the above literature will now be described with reference to FIG. 21.

Referring to FIG. 21, reference numeral 310 denotes transform coefficient holding means for temporarily holding a transform coefficient; reference numeral 320 denotes effective address detecting means for scanning all elements of the transform coefficient in each block held in the transform coefficient holding means 310 and detecting an effective address; reference numeral 330 denotes quantization means for quantizing the transform coefficient held in the transform coefficient holding means 310 to compute a quantized coefficient; reference numeral 340 denotes zero generating means for generating zero; and reference numeral 350 denotes selecting means for comparing a reading address of the transform coefficient to the quantization means 330 and an effective address detected by the effective address detecting means 320 and selecting a result of computation by the quantization means 320 until the effective address is reached, whereas selecting a zero output from the zero generating means 340 after the effective address is reached.

The operation of the above system will now be described with reference to FIGS. 21 and 22.

The system mentioned in the above literature uses the facts that the transform coefficient after DCT is concentrated at a low degree and that zero need not be quantized. Then, the transform coefficient is preliminarily scanned to obtain an effective range of quantization, and only the elements of the transform coefficient falling within the effective range are subjected to quantization, thereby reducing an amount of computation for quantization to attain a high-speed operation of quantization.

For example, prior to performing the quantization, the elements of the transform coefficient are scanned in the order reverse to a conventional scanning order called zigzag scan, and the number of scans until first detection of a non-zero coefficient is set as a maximum degree meaning the effective address. Then, the remaining elements subsequent to the effective address are not subjected to the quantization, but they are set as all zero, thus performing the quantization processing at high speeds.

Specifically in an example of the transform coefficient shown in FIG. 22, first detection of a non-zero coefficient by the reverse zigzag scan is effected at the 39th element in accordance with the order shown in FIG. 2. Accordingly, the remaining elements from the 40th element are not subjected to the quantization, but they are set as zero. Such a zero region thus obtained occupies 37.5% of the whole region, thus resulting in a reduction in processing time to $\frac{2}{3}$.

In the transform coefficient obtained by performing DCT to a natural image, most signal power is concentrated at a low-frequency region of the transform coefficient and very small signal power is concentrated at a high-frequency region of the transform coefficient. The conventional system uses this fact and realizes a high-speed operation by omitting the zero region as the high-frequency region from the subject to the quantization.

However, the high-frequency elements of the transform coefficient are not completely zero because of noise in case of inputting an image by the use of a scanner or the like, and some non-zero elements are present though they are small values (see FIG. 10B).

For this reason, the conventional method for deciding an effective range of quantization by determining whether the elements of the transform coefficient after DCT are zero or non-zero as described in the above literature cannot obtain a satisfactory effect of reduction in the effective range. Accordingly, the effect of increase in the operating speed is not satisfactory. Further, since the range of presence of the zero coefficient per block is decided, an additional circuit for detecting zero is required.

SUMMARY OF THE INVENTION

It is accordingly an object of the present invention to provide an image signal coding device which can attain a high-speed coding operation without increasing a circuit scale.

According to the present invention, there is provided in an image signal coding device including orthogonal transform means for performing two-dimensional orthogonal transform to each of plural pixel blocks as rectangular regions each consisting of N×M pixels (N, M: positive integers) obtained by dividing an image signal to generate a transform coefficient, quantization means for linearly quantizing the transform coefficient by using given quantization characteristics to generate a quantized coefficient, and variable length coding means for performing variable length coding to the quantized coefficient to generate code data; the improvement comprising region holding means for holding region information including a range of the transform coefficient to be linearly quantized by the quantization means and a range of the quantized coefficient to be coded by the variable length coding means.

The schematic configuration of the present invention will now be described with reference to FIG. 1 showing the principle of the present invention. In FIG. 1, components corresponding to those shown in FIG. 9 are denoted by the same reference numerals.

Referring to FIG. 1, reference numeral 100 denotes a DCT section for performing DCT to each of plural pixel blocks as rectangular regions each consisting of N×M pixels (N, M: positive integers) obtained by dividing an image to generate a transform coefficient of a spatial frequency component; reference numeral 101 denotes a linear quantization section for linearly quantizing the transform coefficient by using a quantization threshold set in a quantization matrix 102 to generate a quantized coefficient; reference numeral 103 denotes a variable length coding section for coding the quantized coefficient by using a Huffman code table 104 to generate code data; and reference numeral 110 denotes an effective region holding section for holding the transform coefficient to be quantized in the linear quantization section 101 and an effective region of the quantized coefficient to be coded in the variable length coding section 103.

The image signal coding device having the above configuration according to the present invention operates as follows:

In addition to the operation of the conventional transform coding system, the number of elements of the transform coefficient to be quantized in the linear quantization section 101 and the number of elements of the quantized coefficient to be coded in the variable length coding section 103 are decided according to effective region information held in the effective region holding section 110. Therefore, as compared with the conventional system intended to omit processing for only the quantization, the present invention can omit processing for both the quantization and the variable length coding.

In the transform coding, the quantization and the variable length coding are performed usually in the order shown in FIG. 2. Accordingly, when "49" is set as the effective region information, for example, the processing for both the quantization and the variable length coding of the 50th to 63th elements can be omitted. The effective region information mentioned herein means the number of scans of the transform coefficient by reverse zigzag scanning until first detecting a non-zero coefficient.

The effective region can be decided according to the following facts.

The signal power after DCT is mostly concentrated at the low-frequency coefficient and hardly concentrated at the high-frequency coefficient. Further, since a quantization matrix having high-frequency suppressing characteristics is used, the high-frequency quantized coefficient after quantization almost becomes zero.

Accordingly, the processing for quantization of the transform coefficient that is expected to become zero after quantization can be omitted. Further, when it is expected that the remaining elements of the quantized coefficient in the block are all zero in coding the AC components in the variable length coding section 103, the subsequent processing for coding can be omitted by inserting an EOB (end of block). That is, the effective region can be decided by obtaining a non-zero range of the quantized coefficient by a preliminary test or the like according to the statistic property of an image to be subjected to the coding and the high-frequency suppressing characteristics of the quantization matrix to be used for the coding.

The procedure for deciding the effective region will now be described by employing specific data.

FIGS. 3A, 3B, 4A, and 4B show the number of elements of the quantized coefficient in each block that do not become zero when dividing an actual image into pixel blocks each consisting of 8×8 pixels, performing DCT to each pixel block, and then quantizing the transform coefficient obtained by using various quantization matrices having different characteristics shown in FIGS. 5A, 5B, 5C, and 5D, respectively.

The image used is obtained by inputting a photograph of a figure picture with a scanner having a resolution of about 16 dots/mm, and has a size of 1024 pixels×1024 lines.

The quantization matrices shown in FIGS. 5B to 5D are generated by multiplying different given values by each quantization threshold of the quantization matrix shown in FIG. 5A. Such processing will be called scaling of the quantization matrix, and each given value multiplied by each quantization threshold will be called a scaling factor. The quantization matrix shown in FIG. 5B is generated by scaling the quantization matrix shown in FIG. 5A with a scaling factor of ½. Similarly, the quantization matrix shown in FIG. 5C is generated by scaling the quantization matrix shown in FIG. 5A with a scaling factor of 2, and the quantization matrix shown in FIG. 5D is generated by scaling the quantization matrix shown in FIG. 5A with a scaling factor of 4.

The scaling of the quantization matrix is known as a method for easily controlling a compression rate. The high-frequency suppressing characteristics become stronger in the order of FIG. 5B, FIG. 5A, FIG. 5C, and FIG. 5D, and the compression rate also becomes higher in the same order as above.

It will be understood from FIGS. 3A, 3B, 4A, and 4B that the stronger the high-frequency suppressing characteristics of the quantization matrix, the less the significant quantized coefficient occurs in the high-frequency region. Further, if the frequency of occurrence of the significant coefficient is very small, such a significant coefficient may be omitted from the effective region because the influence on an image quality is minute.

As described above, according to the present invention, the range of the quantized coefficient to be subjected to the quantization processing and the variable length coding processing is decided according to the image to be subjected to the coding and the characteristics of the quantization matrix, and the processing for the quantized coefficient out of the above range is omitted, thereby making the processing speed greatly higher than that in the conventional method.

Furthermore, it is unnecessary to search a zero coefficient in each block and decide an effective range as in the conventional system, thereby eliminating an increase in scale of the device.

In particular, the effect of the high-speed processing is remarkable in case of the coding using an image such as a natural image having a high tendency of concentration of electric power to a low-frequency region or using a quantization matrix having strong high-frequency suppressing characteristics.

Other objects and features of the invention will be more fully understood from the following detailed description and appended claims when taken with the accompanying drawings.

BRIEF DESCRIPTION OF THE DRAWINGS

FIG. 2 is a view illustrating one-dimensional arrangement by zigzag scan;

FIG. 3A is a view illustrating a frequency of occurrence of a significant quantization coefficient by using a fundamental quantized matrix;

FIG. 3B is a view illustrating a frequency of occurrence of a significant quantization coefficient by using a quantized matrix obtained by scaling the fundamental quantization matrix with a scaling factor of ½;

FIG. 4A is a view illustrating a frequency of occurrence of a significant quantized coefficient by using a quantization matrix obtained by scaling the fundamental quantization matrix with a scaling factor of 2;

FIG. 4B is a view illustrating a frequency of occurrence of a significant quantized coefficient by using a quantization matrix obtained by scaling the fundamental quantization matrix with a scaling factor of 4;

FIG. 5A is a view illustrating the fundamental quantization matrix;

FIG. 5B is a view illustrating the quantization matrix obtained by scaling the fundamental quantization matrix with a scaling factor of ½;

FIG. 5C is a view illustrating the quantization matrix obtained by scaling the fundamental quantization matrix with a scaling factor of 2;

FIG. 5D is a view illustrating the quantization matrix obtained by scaling the fundamental quantization matrix with a scaling factor of 4;

FIG. 7A is a view illustrating an effective region set by preliminarily omitting the elements of the quantized coefficient less frequently occurring by the use of the fundamental quantization matrix shown in FIG. 5A;

FIG. 7B is a view similar to FIG. 7A, by the use of the quantization matrix shown in FIG. 5B;

FIG. 8A is a view similar to FIG. 7A, by the use of the quantization matrix shown in FIG. 5C;

FIG. 8B is a view similar to FIG. 7A, by the use of the quantization matrix shown in FIG. 5D;

FIGS. 10A, 10B, and 10C are views illustrating a pixel block, a transform coefficient, and a quantization matrix, respectively, used in performing DCT and quantization;

FIGS. 12A, 12b, and 12C are views illustrating a quantized coefficient, a dequantized coefficient, and a decoded pixel block, respectively, used in performing DCT and quantization;

Figures 13, 14:
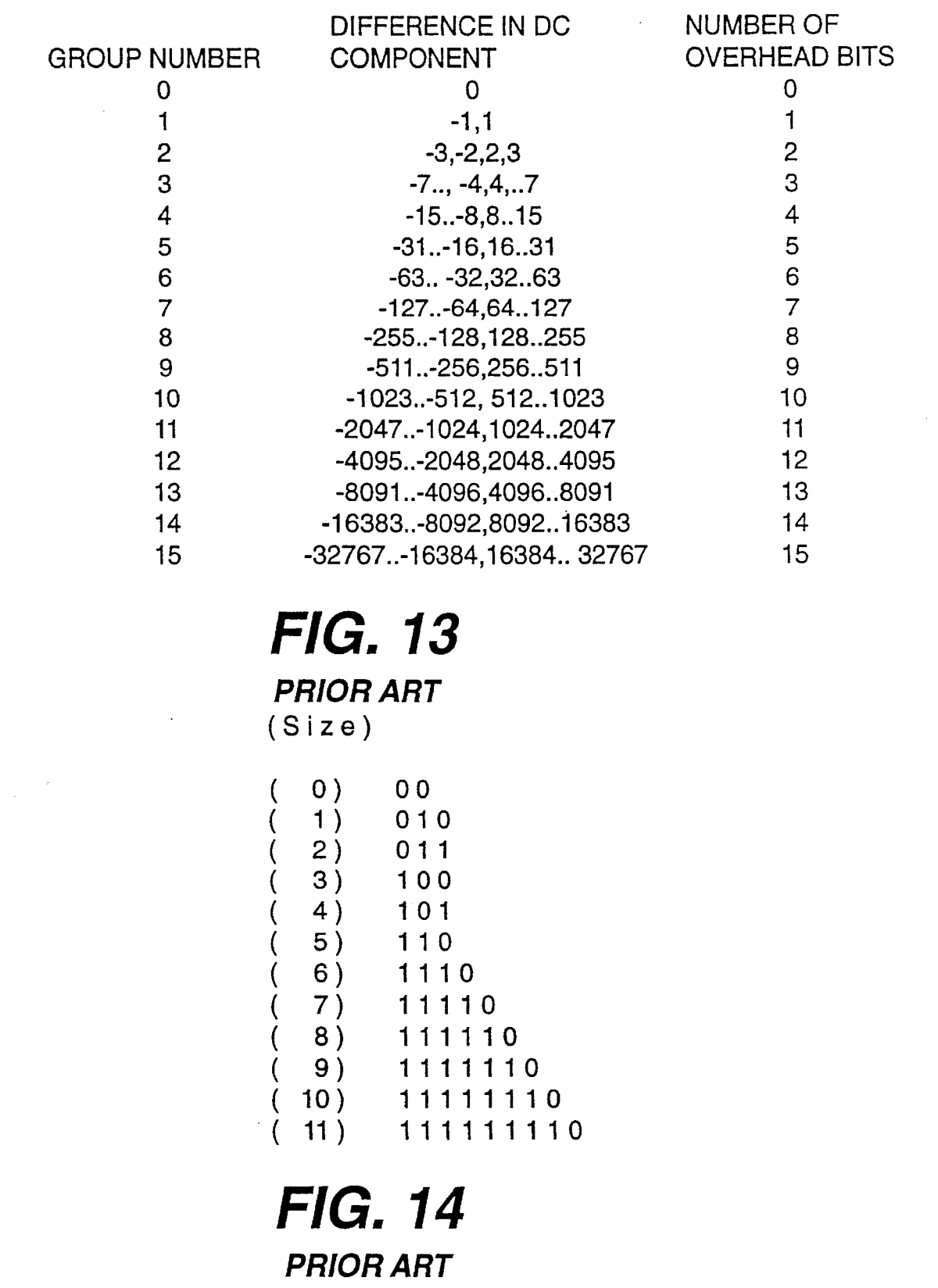

FIG. 13 is a view illustrating the grouping of a DC coefficient;

FIG. 14 is a view illustrating a Huffman code table;

FIG. 15 is a view illustrating the grouping of an AC coefficient;

FIG. 16 is a view illustrating the two-dimensional Huffman coding of the AC coefficient;

FIG. 17 is a view illustrating a first part of the Huffman code table of the AC coefficient;

Figure 18:
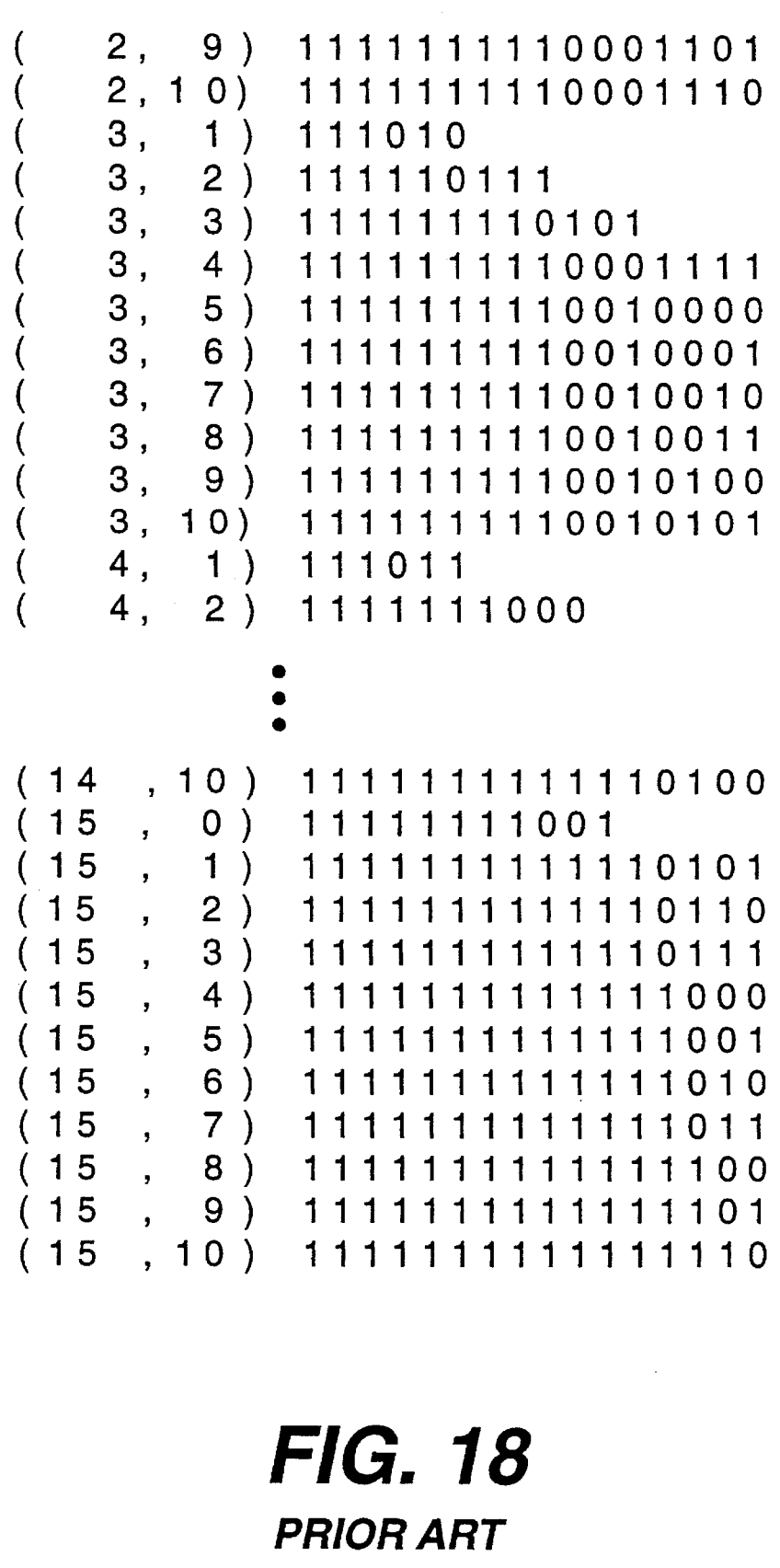

FIG. 18 is a view illustrating a second part of the Huffman code table of the AC coefficient;

FIG. 19 is a view illustrating the coding of the quantized coefficient shown in FIG. 12A;

FIG. 20 is a view illustrating a bit string to be output;

DETAILED DESCRIPTION OF THE PREFERRED EMBODIMENTS

Figure 1:
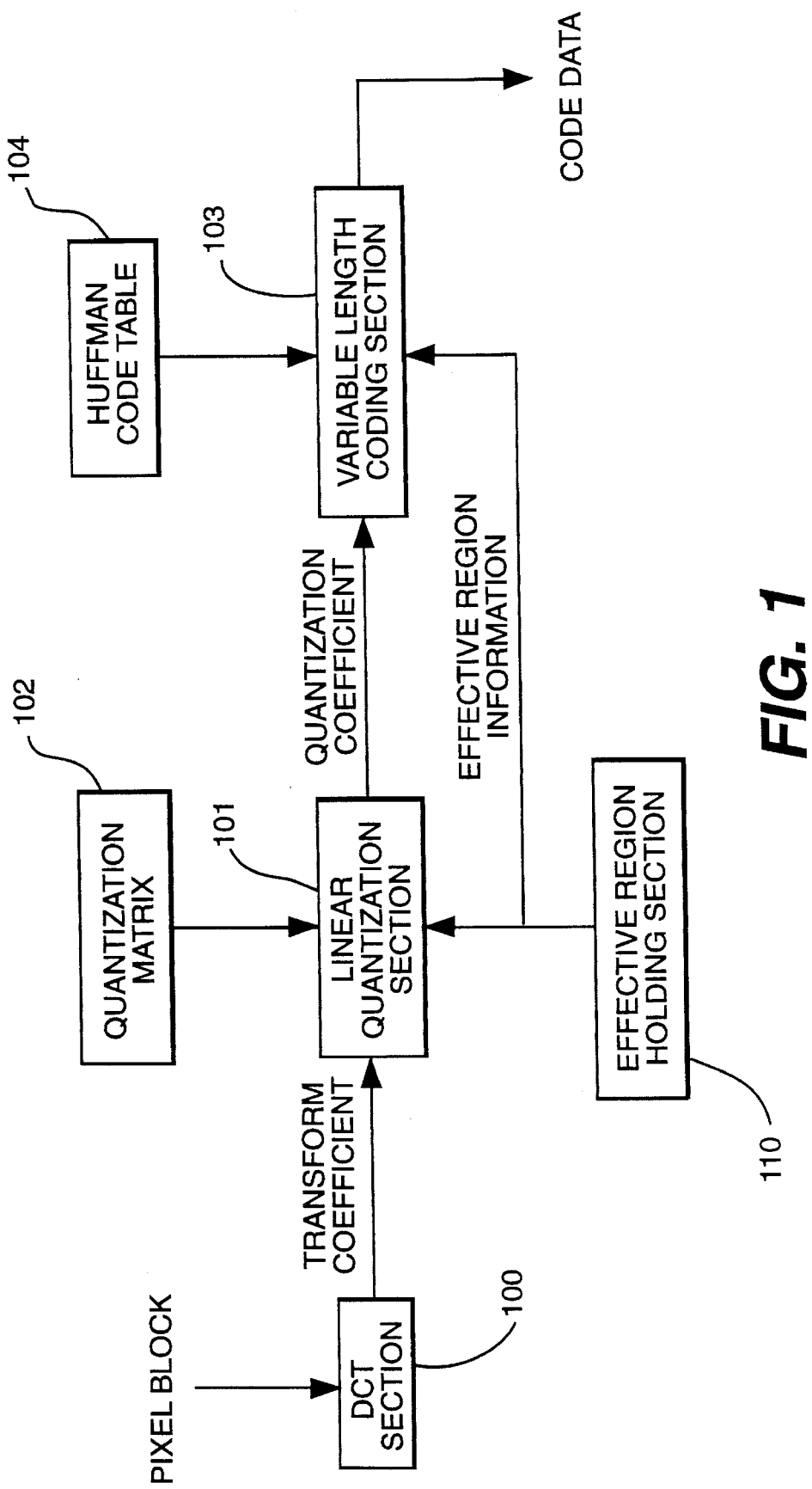
FIG. 1 is a schematic block diagram showing the principle of the present invention.
Figure 6:
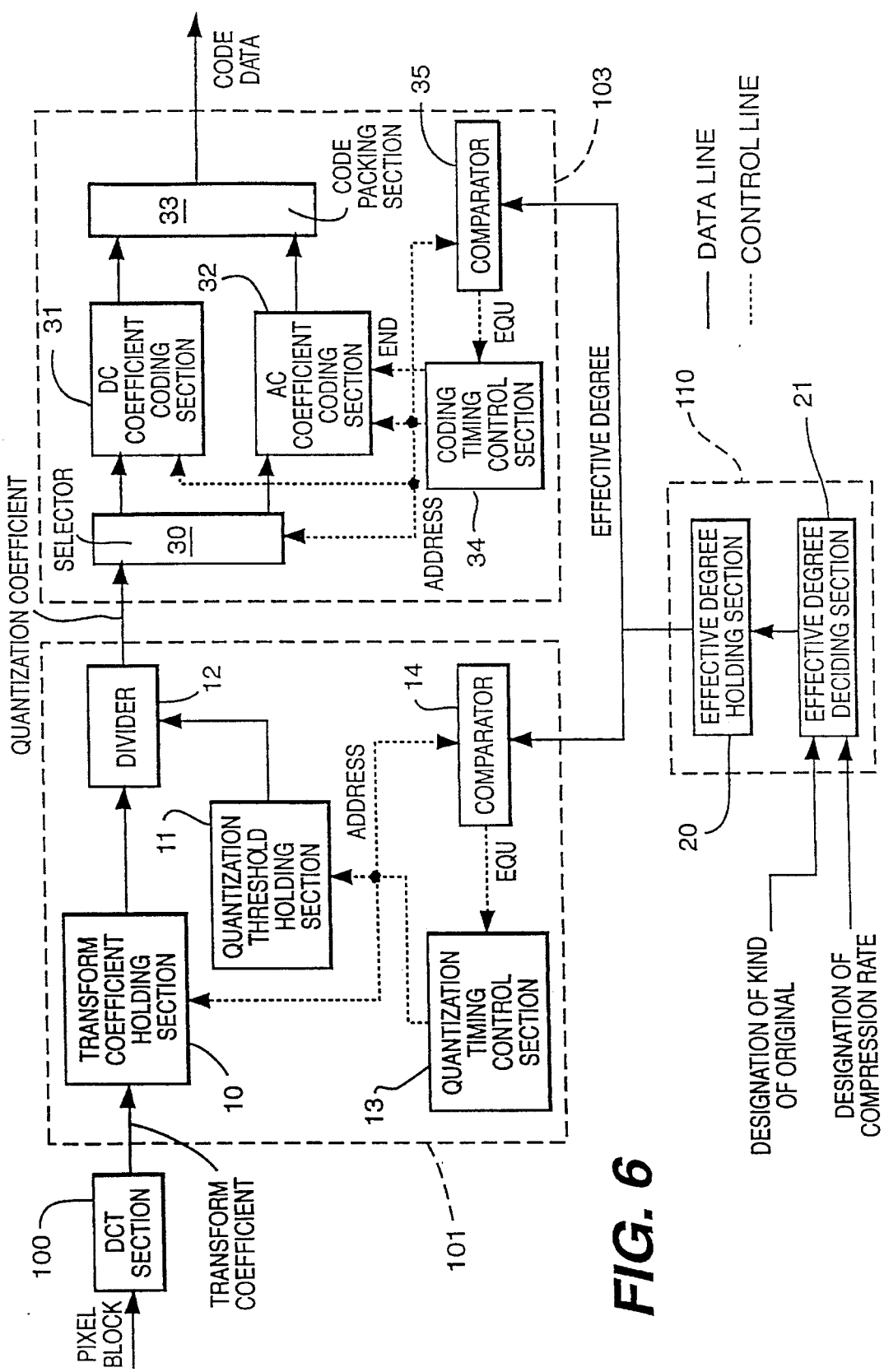
FIG. 6 is a block diagram of a preferred embodiment of the present invention.
Figure 9:
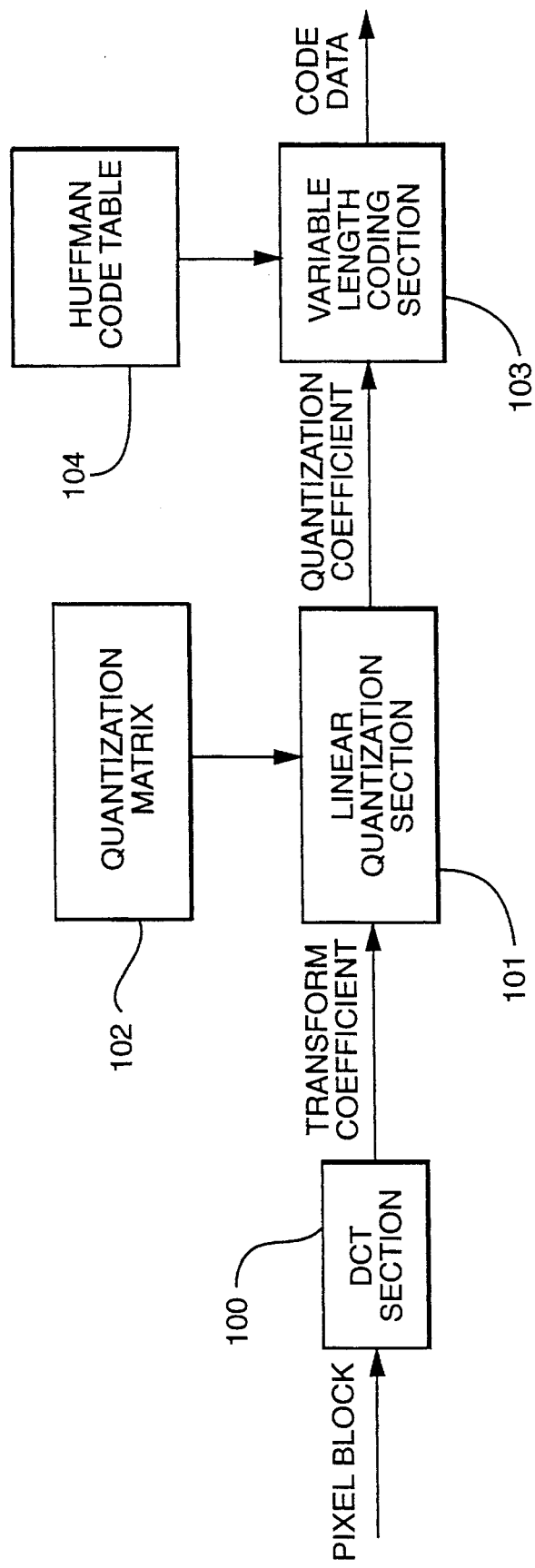
FIG. 9 is a schematic block diagram showing a transform coding system in the related art.
Figure 11:
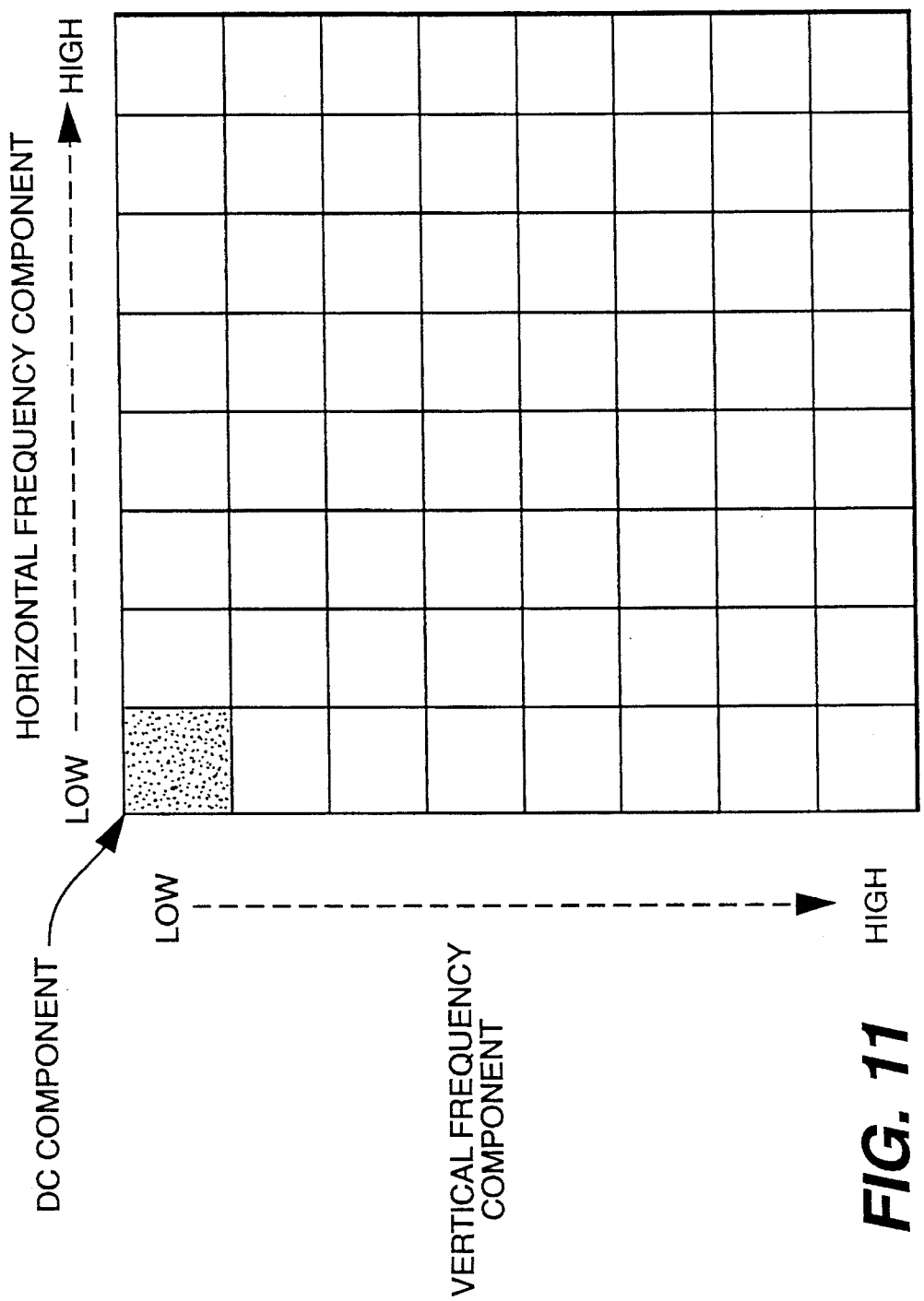
FIG. 11 is a view illustrating a frequency distribution of a transform coefficient.
Figure 21:
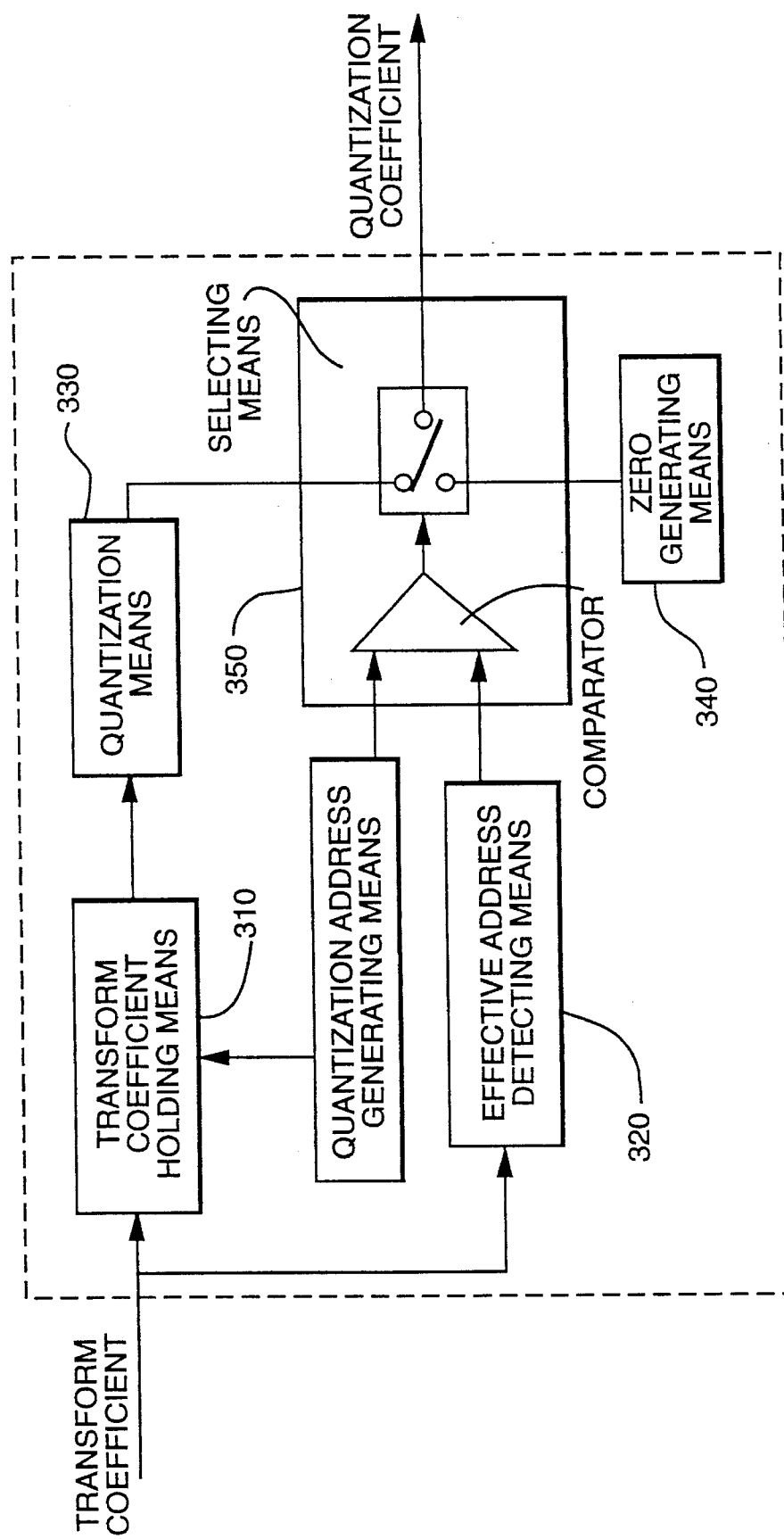
FIG. 21 is a schematic block diagram of a related art system intended to attain a high-speed operation for quantization.
Figure 22:
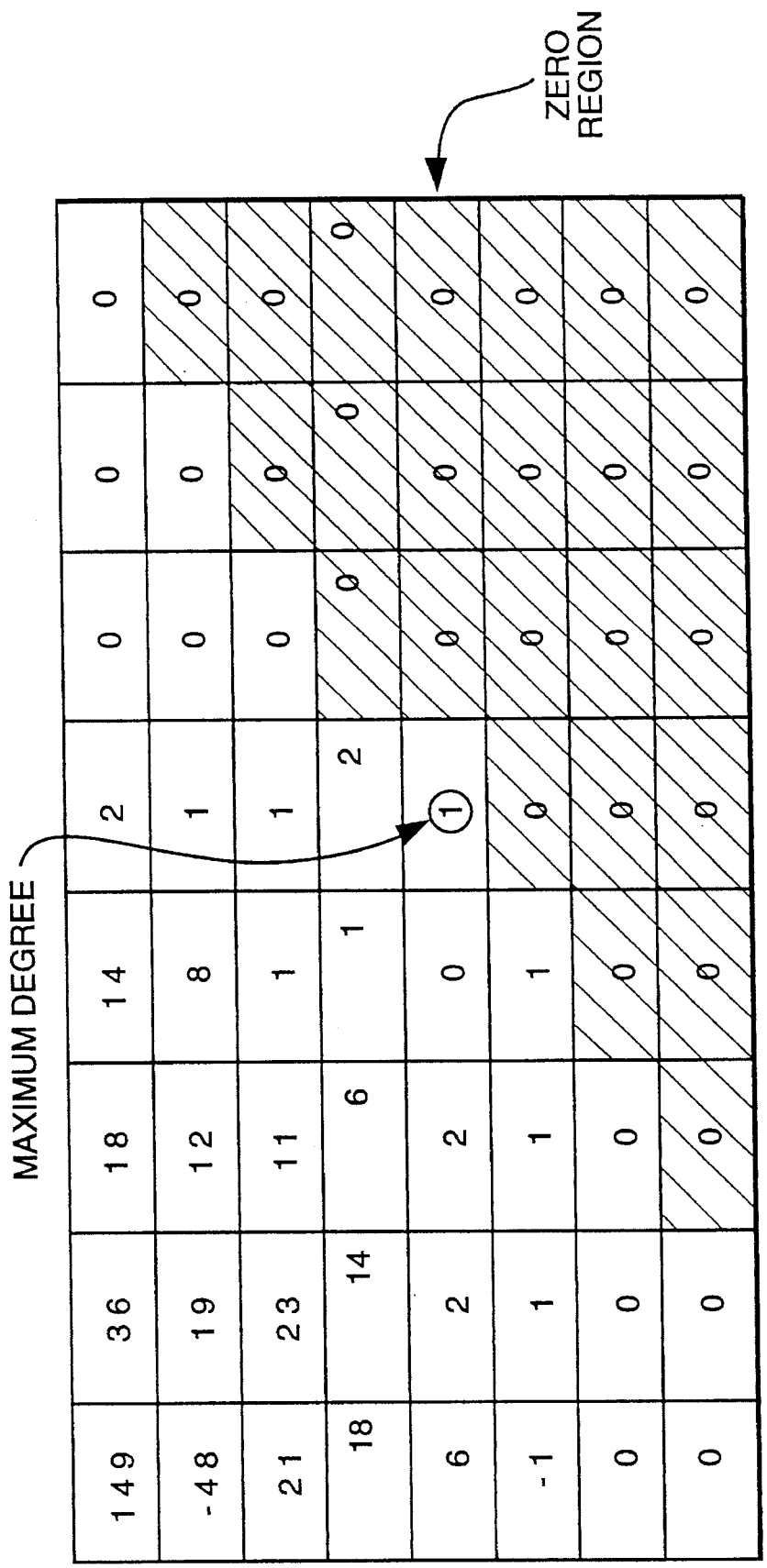
FIG. 22 is a view illustrating the principle of the system shown in FIG. 21.

Referring to FIG. 6 showing a preferred embodiment of the present invention, reference numeral 100 denotes a DCT section for performing DCT to each pixel block to generate a transform coefficient; reference numeral 101 denotes a linear quantization section for linearly quantizing the transform coefficient to generate a quantized coefficient; reference numeral 103 denotes a variable length coding section for coding the quantized coefficient to generate code data; and reference numeral 110 denotes an effective region holding section for holding an effective region of the transform coefficient to be quantized in the linear quantization section 101 and an effective region of the quantized coefficient to be coded in the variable length coding section 103.

The linear quantization section 101 is composed of a transform coefficient holding section 10 for holding the transform coefficient generated from the DCT section 100, a quantization threshold holding section 11 for holding a quantization threshold of a quantization matrix, a divider 12 for reading one element of the transform coefficient held in the transform coefficient holding section 10 and one element of the quantization threshold held in the quantization threshold holding section 11 corresponding to the above element of the transform coefficient and dividing the element of the transform coefficient by the corresponding element of the quantization threshold to generate a quantized coefficient, a quantization timing control section 13 for generating address information indicating a position of the element to be quantized and a position of the corresponding element of the quantization threshold, and a comparator 14 for comparing an effective address indicating an effective region in each block with an address signal generated from the quantization timing control section 13 to generate an EQU signal indicating the equality of the effective address and the address signal if they are equal. The effective address means an effective degree, and both has the same value.

The variable length coding section 103 is composed of a selector 30 for selecting an output destination of the quantized coefficient according to the address of the quantized coefficient, a DC coefficient coding section 31 for coding the quantized coefficient if the quantized coefficient is a DC coefficient, an AC coefficient coding section 32 for coding the quantized coefficient if the quantized coefficient is an AC coefficient and for coding an end of block (EOB) at a timing when receiving an END signal from a coding timing control section 34 to be hereinafter described to complete the coding of one block, a code packing section 33 for combining variable length codes generated from the DC coefficient coding section 31 and the AC coefficient coding section 32 to generate code data, a coding timing control section 34 for generating address information indicating a position of an element to be subjected to the variable length coding and generating an END signal indicating the end of the coding operation, and a comparator 35 for comparing an effective address indicating an effective region in each block with an address signal generated from the coding timing control section 34 to generate an EQU signal indicating the equality of the effective address and the address signal if they are equal.

The effective region holding section 110 is composed of an effective degree deciding section 20 for deciding an effective degree according to designation of the kind of an original and designation of a compression rate, and an effective degree holding section 21 for holding the effective degree decided.

The operation of the preferred embodiment mentioned above will now be described.

The effective degree deciding section 21 of the effective region holding section 110 first decides the degree of an effective region according to the designation of the kind of the original input and the designation of the compression rate input. The kind of the original herein means a difference in original such as a character original and a photographic original, and the designation of the compression rate means designation of a scaling factor of a quantization matrix. The degree of the effective region represents a position where the quantization processing and the variable length coding processing in the order of the zigzag scan shown in FIG. 2 are ended. Alternatively, the designation of the compression rate may be effected by preparing a plurality of quantization matrices having different quantization characteristics and using identifiers for identifying these quantization matrices.

In the examples shown in FIGS. 3A, 3B, 4A, and 4B, the effective degree can be decided to "53" when the quantization matrix shown in FIG. 5A is applied to a photographic original. Further, the effective degrees can be decided to "61", "39", and "25" when the quantization matrices shown in FIGS. 5B, 5C, and 5D are applied to the photographic original, respectively.

The effective degree according to the kind of the original and the compression rate can be decided by performing a preliminary test in which the frequency of occurrence of the quantized coefficient is counted for setting of plural originals and the compression rate.

The effective degree decided by the effective degree deciding section 21 is held in the effective degree holding section 20 during coding of the original.

The transform coefficient in one pixel block generated from the DCT section 100 is held in the transform coefficient holding section 10 of the linear quantization section 101. The transform coefficient in the section 10 is read according to the address in the order of the zigzag scan generated from the quantization timing control section 13, and is input into the divider 12. The quantization threshold shown in FIG. 5A and held in the quantization threshold holding section 11 is read according to the address in the order of the zigzag scan generated from the quantization timing control section 13, and is input into the divider 12. The divider 12 performs linear quantization by dividing the input transform coefficient by the corresponding quantization threshold to generate the quantized coefficient.

The address signal generated from the quantization timing control section 13 is also input into the comparator 14, in which the input address signal is compared with the effective degree held in the effective degree holding section 20. If the address signal and the effective degree are equal, the comparator 14 generates the EQU signal to the quantization timing control section 13.

Then, the quantization timing control section 13 stops the reading from the transform coefficient holding section 10 and the quantization threshold holding section 11, and resets the address information.

The selector 30 of the variable length coding section 103 generates a first element of the input quantized coefficient in each block to the DC coefficient coding section 31 and generates the remaining elements to the AC coefficient coding section 32 according to the address signal generated from the coding timing control section 34.

The DC coefficient coding section 31 performs Huffman coding of a difference in DC coefficient between the current block and the previous block to generate a Huffman code obtained to the code packing section 33. The AC coefficient coding section 32 counts a zero run of an ineffective coefficient and performs Huffman coding of the combination of the zero run and a group number of an effective coefficient subsequent to the ineffective coefficient to generate a Huffman code obtained to the code packing section 33. Then, the code packing section 33 continuously packs the input variable length codes to generate them as code data.

The address signal generated from the coding timing control section 34 is also input into the comparator 35, in which the input address signal is compared with the effective degree held in the effective degree holding section 20. If the address signal and the effective degree are equal, the comparator 35 generates an EQU signal to the coding timing control section 34.

When receiving the EQU signal, the coding timing control section 34 generates an END signal to the AC coefficient coding section 32 to reset the address information. Further, when receiving the END signal, the AC coefficient coding section 32 encodes an end of block (EOB) to complete the coding of one block.

Similar processing is repeated for each block to encode the image data of the whole image.

In the above preferred embodiment, the effective degree is set to the number of scans to the elements of the transform coefficient by reverse zigzag scan until a non-zero coefficient is first detected. Alternatively, the effective degree may be obtained by preliminarily omitting the elements of the quantized coefficient less frequently occurring and then performing reverse zigzag scan. In this case, a lower effective degree can be set.

For example, it is assumed to set "42", "53", "35", and "27" as the effective degrees indicating the effective regions according to the quantization matrices having four different characteristics shown in FIGS. 5A, 5B, 5C, and 5D, respectively, in order to omit the high-frequency elements of the quantized coefficient less frequently occurring.

FIGS. 7A, 7B, 8A, and 8B show the effective regions obtained by the above setting. In each figure, a hatched portion represents a region where the quantization and the variable length coding are omitted. That is, in the examples shown in FIGS. 7A, 7B, 8A, and 8B, 21, 10, 28, and 36 elements of the quantized coefficient are omitted, respectively, from the subject to the quantization processing and the variable length coding processing. In this case, the processing time is reduced by 32.8%, 15.6%, 43.8%, and 56.3% in FIGS. 7A, 7B, 8A, and 8B, respectively, as compared with the case where all elements of the quantized coefficient are processed.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In an image signal coding device including orthogonal transform means for performing a two-dimensional orthogonal transform to generate transform coefficients for each of a plurality of rectangular pixel blocks each consisting of N×M pixels (N, M being positive integers) obtained by dividing an image signal, quantization means for linearly quantizing said transform coefficients by using given quantization characteristics to generate quantized coefficients, and variable length coding means for performing variable length coding to said quantized coefficients to generate code data; the improvement comprising region holding means for holding region information including a first range of said transform coefficients to be linearly quantized by said quantization means and a second range of said quantized coefficients to be coded by said variable length coding means, wherein said quantizing means omits linearly quantizing the transform coefficients outside of the first range and said variable length coding means omits coding of the quantized coefficients outside of the second range, thereby increasing coding speed.

2. An image signal coding device according to claim 1, wherein said region information is decided according to at least one of said quantization characteristics and an original content to be coded.

3. An image signal coding device according to claim 1, wherein said region information is based on zigzag scanning from a low degree to a high degree in a matrix of said transform coefficients.

4. The image signal coding device of claim 3, wherein the zigzag scanning is performed until a non-zero coefficient is detected.

5. An image signal coding device according to claim 1, wherein said region information is set according to order of zigzag scanning from a low degree to a high degree in a matrix of said quantization coefficients.

6. An image signal coding device according to claim 1, wherein said quantization characteristics comprise a scaling factor for a preset quantization matrix.

7. An image signal coding device according to claim 2, wherein said quantization characteristics comprise a scaling factor for a preset quantization matrix.

8. An image signal coding device according to claim 1, wherein said quantization characteristics comprise identifiers for a plurality of prepared quantization matrices.

9. An image signal coding device according to claim 2, wherein said quantization characteristics comprise identifiers for a plurality of prepared quantization matrices.

\* \* \* \* \*